United States Patent
Willhide et al.

(10) Patent No.: US 7,269,625 B1
(45) Date of Patent: Sep. 11, 2007

(54) SYSTEM AND METHOD FOR MONITORING AND MANAGING AN ENTERPRISE NETWORK

(75) Inventors: Edward M. Willhide, Falls Church, VA (US); Nathaniel H. Cooper, Manassas, VA (US); Steven S. Hodecker, Fairfax, VA (US); Hugh B. Warren, Annadale, VA (US)

(73) Assignee: Edge Technologies, Inc., Fairfax, VA (US)

( * ) Notice: Subject to any disclaimer, the term of this patent is extended or adjusted under 35 U.S.C. 154(b) by 571 days.

(21) Appl. No.: 09/812,136

(22) Filed: Mar. 19, 2001

(51) Int. Cl.
*G06F 15/16* (2006.01)

(52) U.S. Cl. ............... 709/206; 709/203; 709/218; 709/224; 707/10; 711/113

(58) Field of Classification Search ........... 709/203, 709/224, 225, 226, 228, 232, 206, 220, 227, 709/245, 218, 250; 370/389; 714/89; 705/26, 705/16, 22; 707/10, 100; 711/113
See application file for complete search history.

(56) References Cited

U.S. PATENT DOCUMENTS

| | | | | |
|---|---|---|---|---|
| 6,189,030 B1* | 2/2001 | Kirsch et al. | ............... | 709/224 |
| 6,353,448 B1* | 3/2002 | Scarborough et al. | ...... | 345/744 |
| 6,557,026 B1* | 4/2003 | Stephens, Jr. | ............... | 709/203 |
| 6,609,108 B1* | 8/2003 | Pulliam et al. | ............... | 705/27 |
| 6,643,652 B2* | 11/2003 | Helgeson et al. | ............. | 707/10 |
| 6,662,199 B1* | 12/2003 | Flight et al. | ............. | 707/104.1 |
| 6,721,747 B2* | 4/2004 | Lipkin | .......... | 707/10 |
| 6,728,685 B1* | 4/2004 | Ahluwalia | ............... | 705/26 |
| 6,735,602 B2* | 5/2004 | Childress et al. | ........... | 707/200 |
| 6,735,624 B1* | 5/2004 | Rubin et al. | ............... | 709/219 |
| 6,757,709 B1* | 6/2004 | Oberdorfer | ............... | 709/203 |
| 6,850,893 B2* | 2/2005 | Lipkin et al. | ............... | 705/8 |
| 6,901,430 B1* | 5/2005 | Smith | ............... | 709/206 |
| 7,035,944 B2* | 4/2006 | Fletcher et al. | ............. | 709/250 |
| 2002/0069244 A1* | 6/2002 | Blair et al. | ............... | 709/203 |

* cited by examiner

*Primary Examiner*—Khanh Dinh
(74) *Attorney, Agent, or Firm*—Jacobson Holman PLLC

(57) ABSTRACT

A system for providing access to a network is provided. The system includes a management interface system that receives management data from one or more management systems, where each management system provides a type of management data for the network, such as device status data, event data, device performance monitoring data, or other suitable data. A portal system connected to the management interface system receives the management data and presents the management data in a predetermined format, such as in one or more view windows, such that management data from incompatible management systems can be presented in a single user-viewable display.

20 Claims, 8 Drawing Sheets

SYSTEM AND METHOD FOR MONITORING AND MANAGING AN ENTERPRISE NETWORK

FIELD OF THE INVENTION

The present invention pertains to the fields of computer networks and service provider billing, and more particularly to an enterprise portal system and method that allows users to access multiple applications through a single portal workspace.

BACKGROUND OF THE RELATED ART

Enterprise network management systems are used to monitor and control enterprise network operations. For example, enterprise network management systems have been developed for device fault monitoring (such as the NerveCenter™ system available from Veritas Software of Mountain View, Calif.), performance monitoring (such as the Network Health system available from Concord Communications, Inc. of Marlboro, Massachusetts), trouble ticket and help desk functionality (such as the Remedy Help Desk™ system available from Remedy Corporation of Mountain View, Calif.), event management (such as the NetCool™ system available from Micromuse, Inc. of San Francisco, Calif.), device discovery (such as the OpenView™ system available from Hewlett Packard of Palo Alto, Calif.), configuration management (such as the CiscoWorks 2000™ system available from Cisco Systems, Inc. of San Jose, Calif.), standard operating procedures control, and other network management functionality. These various network management systems allow the systems and hardware components that make up an enterprise network to be monitored and managed by one or more users that may be physically dispersed, organizationally dispersed, or otherwise unable to coordinate activities in a central location.

One drawback with such enterprise network management systems is that an operator must continuously monitor many of these tools. For example, a network management operator may need to review a device performance monitoring system and an event management system to determine whether an operating event has occurred, such as a system malfunction, a system error, a device misoperation, or any other condition that requires operator attention. However, in order to continuously monitor these two different systems, the operator must either have two terminals that are set up to each system, or must remember multiple sets of logon data and continuously toggle between multiple windows in order to perform a status update. Thus, the operator must engage in repetitive tasks to continuously monitor these systems. Furthermore, some operators must manage multiple networks, which requires them to perform these tasks for each network. Because these systems are typically produced by different organizations, they are often incompatible, such that they cannot be readily integrated without custom work.

Another drawback with such enterprise network management systems is that an operator must receive extensive training in order to use each of the large number of systems. If an alarm, network, or system event occurs (hereinafter an "operating event"), it may be necessary for the operators to access the report generation tools, device discovery tools, configuration management tools, standard operating procedures control tools, trouble ticket or help desk tools, or other suitable tools. Some operating events may require accessing two or more tools in a certain order in order to resolve the problem. Thus, in order to address all possible operating events that can occur on a network, an operator must have training in each of these tools, in addition to training on how to respond to such operating events.

Another drawback with such enterprise network management systems occurs where multiple networks are being managed, such as by a Management Service Provider ("MSP"). A customer of one of the managed networks might desire access to one or more of the management systems, such as to determine the status of the customer's network or to perform a function, but providing such access might also allow the customer to access any of the other managed networks. Additionally, due to common firewall constraints, a customer is only able to access one application per firewall port. Thus, allowing access to multiple applications would require the managed services provider to open multiple firewall ports to a single user, which creates a security risk.

Access through a proxy server in the screened subnet or other such "DMZ" of the MSP can be provided to allow an external customer to access multiple applications through a single port. However, the customer's web browser must be specially configured in order to allow such access. Furthermore, only limited services are available in this configuration, which prevents the operators of such managed networks from being able to perform many important tasks.

Thus, while network management tools are known and provide useful assistance to skilled operators, such network management tools are often incompatible and are of limited use to an untrained operator.

SUMMARY OF THE INVENTION

In accordance with the present invention, a system and method for providing an enterprise network management portal are disclosed that overcome known problems with managing enterprise networks.

In particular, a system and method for providing an enterprise network management portal are provided that allow two or more enterprise network tools to be monitored or implemented in a single user view window.

In accordance with an exemplary embodiment of the present invention, a portal system for providing access to a network is provided. The portal system includes a management interface system that receives management data from one or more management systems, where each management system provides a type of management data for the network, such as device status data, event data, device performance monitoring data, or other suitable data. The management interface system receives the management data and presents the management data in a predetermined format, such as in one or more view windows, such that management data from non-integrated management systems can be presented in a single user-viewable display. Additionally, the data values in one application can be tied to what information is presented from other applications.

The present invention provides many important technical advantages. One important technical advantage of the present invention is a system and method for an enterprise portal system that allows display data from non-integrated or unrelated management systems to be assembled into a single user-viewable display that allows the user to readily determine the status of the network on a real-time basis, whether any system or component malfunctions have occurred, whether any operating events have occurred, or to otherwise address network problems or conditions. The present invention also provides for workflows to be generated and stored that address such operating events and provide corrective measures, so that an inexperienced operator can respond to operating events in an appropriate manner. Additionally, the invention allows a user to manipulate data to alter the presentation of it, so as to create a "single browser workspace" that eliminates the need to jump between multiple browser or application windows. The present invention also allows a user to access multiple network management systems through a single-port DMZ network configuration behind a firewall, which protects the network management systems from unauthorized access and hides security information on such systems. The present invention also provides for single sign-on to multiple network management systems, which eliminates the need for memorizing multiple user IDs and passwords.

Those skilled in the art will further appreciate the advantages and superior features of the invention together with other important aspects thereof on reading the detailed description that follows in conjunction with the drawings.

DETAILED DESCRIPTION OF THE INVENTION

Figure 1:
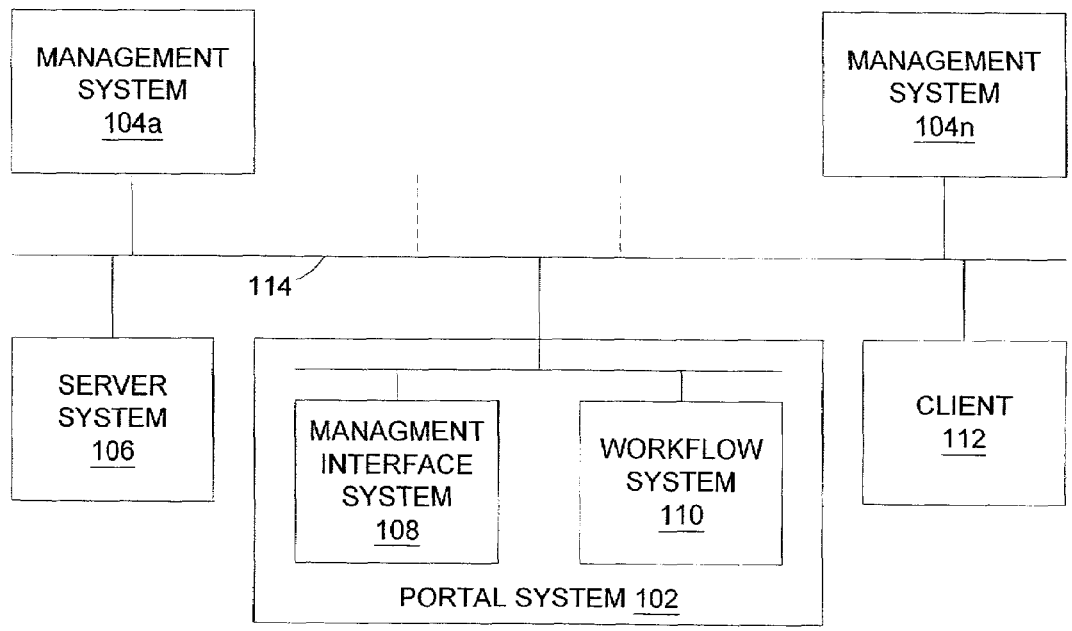
FIG. 1 is a diagram of an enterprise portal system in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of an enterprise portal system 100 in accordance with an exemplary embodiment of the present invention. Enterprise portal system 100 allows data from two or more enterprise network management systems or other suitable systems to be displayed in a viewing portal such that the user can view and interact with data from such systems simultaneously, regardless of whether such systems are compatible with each other.

Enterprise portal system 100 includes portal system 102, management systems 104a through 104n, server system 106, and client 112, each of which can be implemented in hardware, software, or a suitable combination of hardware and software, and which can be one or more software systems operating on one or more general purpose server platforms. As used herein, a software system can include one or more lines of code, objects, agents, threads, subroutines, two or more lines of code or other suitable software structures operating in two or more separate software applications, or other suitable software structure. In one exemplary embodiment, a software system can include one or more lines of code or other suitable software structures operating in a general purpose software application, such as an operating system, and one or more lines of code or other suitable software structures operating in a specific purpose software application.

Portal system 102, management systems 104a through 104n, server system 106, and client 112 are coupled by communications medium 114. As used herein, the term "couple," and its cognate terms such as "couples" and "coupled," can include a physical connection (such as through a copper conductor), a virtual connection (such as through one or more randomly assigned data memory locations of a data memory device), a logical connection (such as through one or more logic gates of a semiconducting device), a wireless connection, other suitable connections, or a suitable combination of such connections. In one exemplary embodiment, systems and components can be coupled to other systems and components through intervening systems and components, such as through an operating system of a general purpose server platform.

Portal system 102 interfaces with management systems 104a through 104n, receives management status data from the management systems 104a through 104n, and provides user-entered data and other suitable data to management systems 104a through 104n. Management systems 104a through 104n are used to determine the status of server system 106, perform corrective actions to systems and components of server system 106, or perform other suitable functions. In one exemplary embodiment, management systems 104a through 104n can include device performance monitoring systems, report generation systems, trouble ticket or help desk systems, event management systems, device discovery systems, configuration management systems, standard operating procedures systems, and other suitable systems. Each of these systems can further be configured to operate individually and without interfacing with other management systems 104a through 104n. Likewise, management systems 104a through 104n can include two or more systems that are configured to operate with each other, but which may not be configured to operate with one or more of the other management systems 104a through 104n. Likewise, other suitable systems besides management systems 104a through 104n can also be used to provide information through portal system 102, such as stock quote data, employee phone number data or other suitable data.

Server system 106 can include one or more servers and one or more corresponding clients, routers, hub switches, software systems, and other suitable systems and devices. Management systems 104a through 104n can provide suitable network management functionality for determining the status of the systems and components operating on server system 106. The software systems of server system 106 can include website software systems, e-mail software systems, chat room software systems, functional applications such as spreadsheet or word processing applications, or other suitable network software systems.

Portal system 102 provides management data from management systems 104a through 104n to client 112 in a single unified View screen. For example, a user of client 112 can be presented with a list of services captured from available management systems, and can be allowed to select one or more of these management system services for presentation on the View screen, such as in one or more channels. Portal system 102 can then generate a preset or preconfigured View screen that includes channels displaying data from the selected management system services and receiving data input from a user for entry into the management system services. The user of client 112 can then edit the size and location of the channels presented in the View screen so as to present the information in a desired format. In this manner, client 112 can configure the View screen to display information that is currently of interest to the user of client 112, but can also reconfigure the View screen as required, such as in response to changing circumstances. Likewise, the user of client 112 can select one of the management systems 104a through 104n shown on the View screen display and can be provided with the complete screen display generated by that management system, and can access services provided by the management system.

Portal system 102 includes management interface system 108 and workflow system 110. Management interface system 108 includes preset management system window configuration data for View screens for client 112, and can store client modified window configuration data, user logon data that may be required for the user to access certain management systems 104a through 104n, channel format data that is used to facilitate an interface with management systems 104a through 104n through a DMZ firewall or within an intranet, and other suitable data. Portal system 102 allows management data to be requested from management systems 104a through 104n, such that the management data received from the management systems can then be presented in a channel with user adjustable dimensions.

Workflow system 110 includes one or more workflows that can be used to respond to operating events. In one exemplary embodiment, workflow system 110 includes a pre-formatted series of steps and responses, such that a user can access workflow system 110 through client 112 and respond to operating events even if the user does not know the correct sequence of steps to take. In this manner, a skilled user can set up network management workflows that can be used to respond to operating events such that a user who lacks the training level of the skilled operator can still perform the required corrective actions.

In addition to providing two or more channels to two or more unrelated management systems 104a through 104n or other related systems, portal system 102 also acts as a proxy behind the firewall between client 112, management systems 104a through 104n, and server system 106. Because all interactions between client 112 and management systems 104a through 104n interface through portal system 102, it is not possible for a user of client 112 to directly access either management systems 104a through 104n or server system 106. In this manner, any actions that the client 112 can perform are limited to those that are allowed through portal system 102. The user of client 112 will also be unable to determine the network address or other related information for management systems 104a through 104n, such as could allow the user to perform unauthorized functions.

In operation, enterprise portal system 100 is used to provide a View screen that includes one or more management channels for use in conjunction with a server system 106. Portal system 102 allows the user to configure management data from one or more management systems such that the user can observe the status of the network, the status of corrective actions taken, or other suitable information without being required to toggle between applications that may be dissimilar, incompatible, or that otherwise prevent the user from continuously viewing the data on one screen. Likewise, portal system 102 allows workflows to be created that link data from various management systems 104a through 104n such that corrective actions for resolving operating events or other repeatable processes can be performed without requiring an operator to know the sequence of steps or to enter redundant data in two or more different applications.

Figure 2:
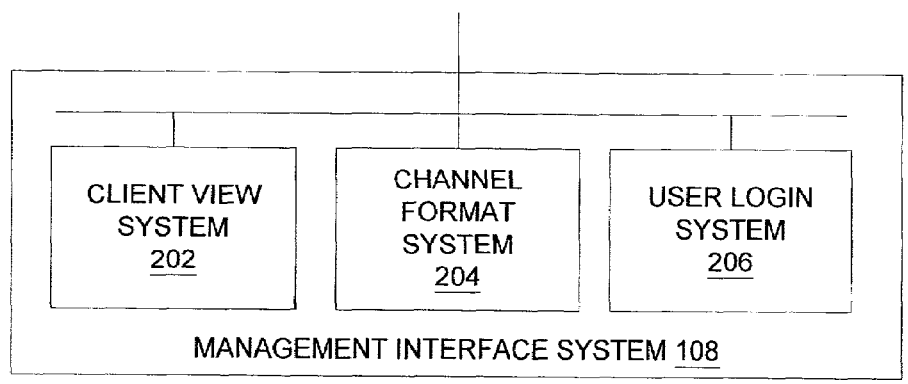
FIG. 2 is a diagram of a system for providing network management application and data interface functionality in accordance with an exemplary embodiment of the present invention.

FIG. 2 is a diagram of a system 200 for providing network management application and data interface functionality in accordance with an exemplary embodiment of the present invention. In 200, management interface system 108 includes client view system 202, channel format system 204, and user logon system 206, each of which can be implemented in hardware, software, or a suitable combination of hardware and software, and which can be one or more software systems operating on a general purpose server platform. In particular, system 200 can be implemented using document files in the XML format having one or more predefined schema, document type definitions, data field formats, and other suitable data.

Client view system 202 allows users to create new views or personalize existing views by selecting which channels they would like to see and customizing their layout in the view. Users can arrange channels within the view, the height within each channel, and other suitable data. Client view system 202 receives view data that can include one or more preset client view formats, role or user-restricted view formats, user-modified view formats, and other formats that include channel identification data, window size data, data field display data, workflow display data, and other suitable client view data. Client view system 202 also receives the management data generated by each of management systems 104a through 104n, and assembles the management data into a channel corresponding to selections received from the user, user restriction data or role restriction data imposed by an operator, and other suitable format data. Data from non-management systems can also be provided where suitable. Client view system 202 thus receives user restriction data and role restriction data that can restrict the information provided through system 200 to a user from management systems 104a through 104n, based upon the user's identification or role data assigned to the user. For example, users can be assigned to a role or can be individually identified, and this role or user data can be used to restrict data that might be presented to the user from management systems 104a through 104n, non-management systems, workflow functionality that the user will be allowed to perform, and other suitable functionality.

Client view system 202 also manages the data generated by each management system 104a through 104n, so as to prevent any single management system 104a through 104n from taking over the client 112. In one exemplary embodiment, a management system 104 may generate screen control commands, such as "TOP" call commands, hard-coded uniform resource locator ("URL") or frame references, rule-based text manipulation of proxied data sources, or other screen control commands. Client view system 202 filters out these screen control commands and can add appropriate headers, footers, and other formatting information that is used to maintain a uniform workspace on the user's screen. Client view system 202 further allows the user to temporarily expand a channel from one management system to fill the view, while maintaining the page format and background and without disrupting the state of other applications.

Channel format system 204 uses channel format data to interface with management systems 104a through 104n to request management system data, to receive the management system data for presentation to users through client view system 202, and to perform functionality through management systems 104a through 104n. In one exemplary embodiment, the channel format data can be used to create one or more channels for access to each management system. Channel format system 204 can include one or more *.XML files, application program interfaces (APIs), template files, or other suitable structures that are used to allow data received from client 112 to be translated to a request from management systems 104a through 104n. Role restriction data and user restriction data can also be implemented in channel format system 204 to provide classes of users or individual users with predetermined management system data or to allow them to perform predetermined workflows using management systems 104a through 104n. Channel format system 204 can also be used to allow users to build their own channels, such as to other applications besides management systems 104a through 104n. In this exemplary embodiment, channel format system 204 can be used to provide users with weather data, stock data, sports data, or other suitable external system data.

User logon system 206 is used to provide users with single logon functionality for access to management systems 104a through 104n. In one exemplary embodiment, user logon system 206 includes a map of user ID and logon password data for each of management systems 104a through 104n that a user is authorized to access, such that the user need only logon one time for access to such systems. The map can include functional components that can process cookies received from each management system, hypertext markup language ("HTML") tags or other software structures that are used to specify where password data must be entered, and other suitable functional components. User logon system 206 thus interacts with channel format system 204 and client view system 202 to allow those systems to interface with management systems 104a through 104n for a given user.

In operation, system 200 is used to provide management system and non-management system interface functionality at a portal system. System 200 allows channels to be configured for interfacing with management systems, and allows views to be configured for presenting data from the management systems to the user. Likewise, system 200 can provide single logon functionality such that the user does not have to logon to each separate management system.

Figure 3:
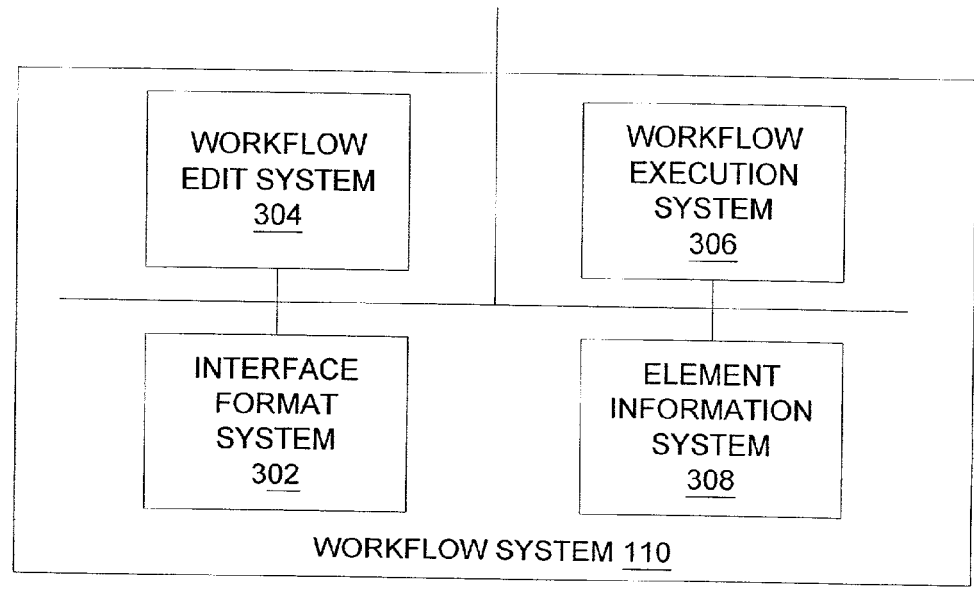
FIG. 3 is a diagram of a system for providing workflow functionality in accordance with an exemplary embodiment of the present invention.

FIG. 3 is a diagram of a system 300 for providing workflow functionality in accordance with an exemplary embodiment of the present invention. In system 300, workflow system 110 includes workflow edit system 304, interface format system 302, workflow execution system 306, and element information system 308, each of which can be implemented in hardware, software, or a suitable combination of hardware and software, and which can be one or more software systems operating on a general purpose server platform.

Interface format system 302 can transfer data fields between each of client 112 and management systems 104a through 104n in accordance with predetermined data field definitions. In one exemplary embodiment, two related data fields for a workflow can be correlated such that the data fields can be transferred where required in a workflow. Interface format system 302 performs any necessary format conversions to make the transfer seamless and to insure compatibility of data.

Workflow edit system 304 allows an operator to identify workflow process data so as to set up a workflow for performing device troubleshooting, event management, or other functions. In one exemplary embodiment, the workflow process data can include command data or input data that identify a sequence of events that may need to be performed with various system management tools, such as an event management tool, a trouble ticket help desk tool, a device discovery tool, a configuration management tool, a standard operating procedures tool, a report generation tool, a device performance monitoring tool, or other suitable tools. Each of these tools can include one or more software controls, one or more data input or output fields, or other suitable data that can be used to respond to operating events or other conditions that may occur in a network. Workflow edit system 304 allows an operator to sequence the access to such tools and the correlation of data fields within such tools so as to automate response workflows for handling operating events. The workflow process data can also include description data fields, tutorial data fields, question data fields, or other suitable information to facilitate the use of workflows by operators that may lack some or all of the knowledge required to implement the workflow without proper guidance.

Workflow execution system 306 receives the workflow sequence data from workflow edit system 304, and executes the workflow sequence in response to an execution command received from a user. Workflow execution system 306 then interfaces with management systems 104a through 104n in accordance with the workflow received from workflow edit system 304, and transfers data fields in accordance with previously-defined rules using interface format system 302 or other suitable systems. Workflow execution system 306 can also prompt the user to make a selection, enter data, terminate a workflow, or perform other suitable functions.

Element information system 308 provides network element data for use in or in response to workflows executed through workflow execution system 306. In one exemplary embodiment, element information system 308 can obtain element data in response to element data queries in a workflow, can allow an operator to obtain element information that may be necessary for implementing a workflow, or can perform other suitable element information functions.

In operation, system 300 allows an operator to set up a workflow for responding to an operating event or condition in a network. System 300 allows two or more unrelated management systems to be tied together through a common platform such that data required or presented by such systems can be seamlessly transferred. System 300 thus allows network operating events to be identified in advance, such that less skilled operators can respond to such operating events or other system conditions without having a thorough understanding of all event management system tools, the network, or other required information.

Figure 4:
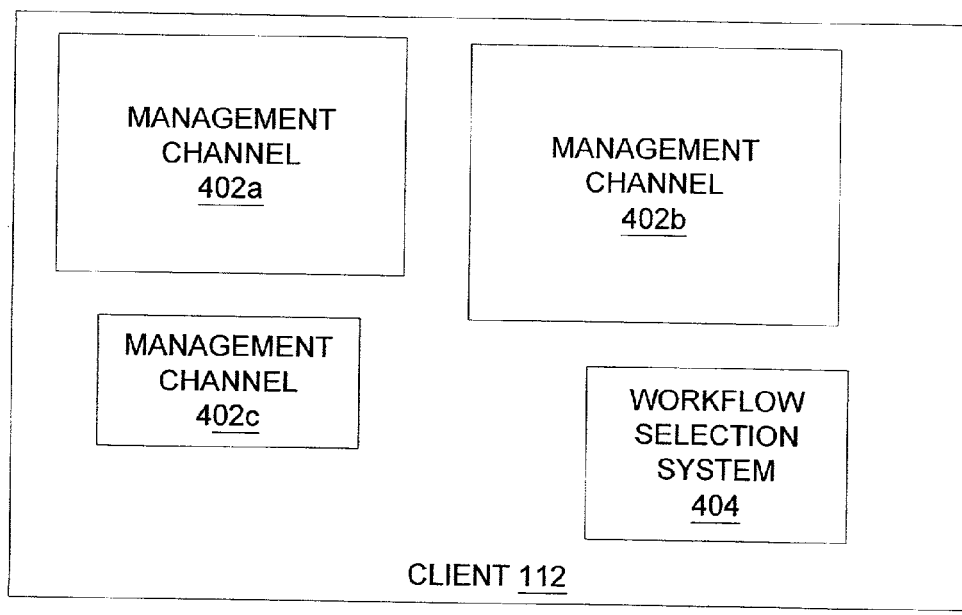
FIG. 4 is a diagram of a client view in accordance with an exemplary embodiment of the present invention.

FIG. 4 is a diagram of a client view 400 in accordance with an exemplary embodiment of the present invention. In client view 400, client 112 displays management channels 402a through 402c, and workflow selection system 404.

Management channels 402*a* through 402*c* are user configurable windows presenting data generated by three corresponding management systems. Likewise, management channels 402*a* through 402*c* can include three windows generated by a single management system, or other suitable configurations. The data presented in management channels 402*a* through 402*c* can be determined by a user, set up in accordance with a role definition or user definition, or otherwise configured for predetermined users, roles or situations. Likewise, the user can select one of management channels 402*a* through 402*c*, and that management window can then be expanded to fill the entire screen. The user can also elect to close out a management window, add a different management window, or perform other functions.

Workflow selection system 404 presents available workflows to a user. In one exemplary embodiment, an operating event can be detected by workflow selection system 404, such as by receiving flag data, error data, or other suitable data. Workflow selection system 404 can then generate a list of available workflows for the user to select from. For example, management channel 402*a* can include a list of misoperating devices from a device performance monitoring system. If a user selects the management channel 402*a*, a workflow selection list can be presented for each of the devices that is misoperating. Likewise, other suitable connections can be made between workflow selection system 404 and the management system output.

In operation, client view 400 presents an exemplary user adjustable view for presenting management system data and one or more management channels. Client view 400 also presents workflow selection data for a user to respond to operating events or otherwise perform network management functionality.

Figure 5:
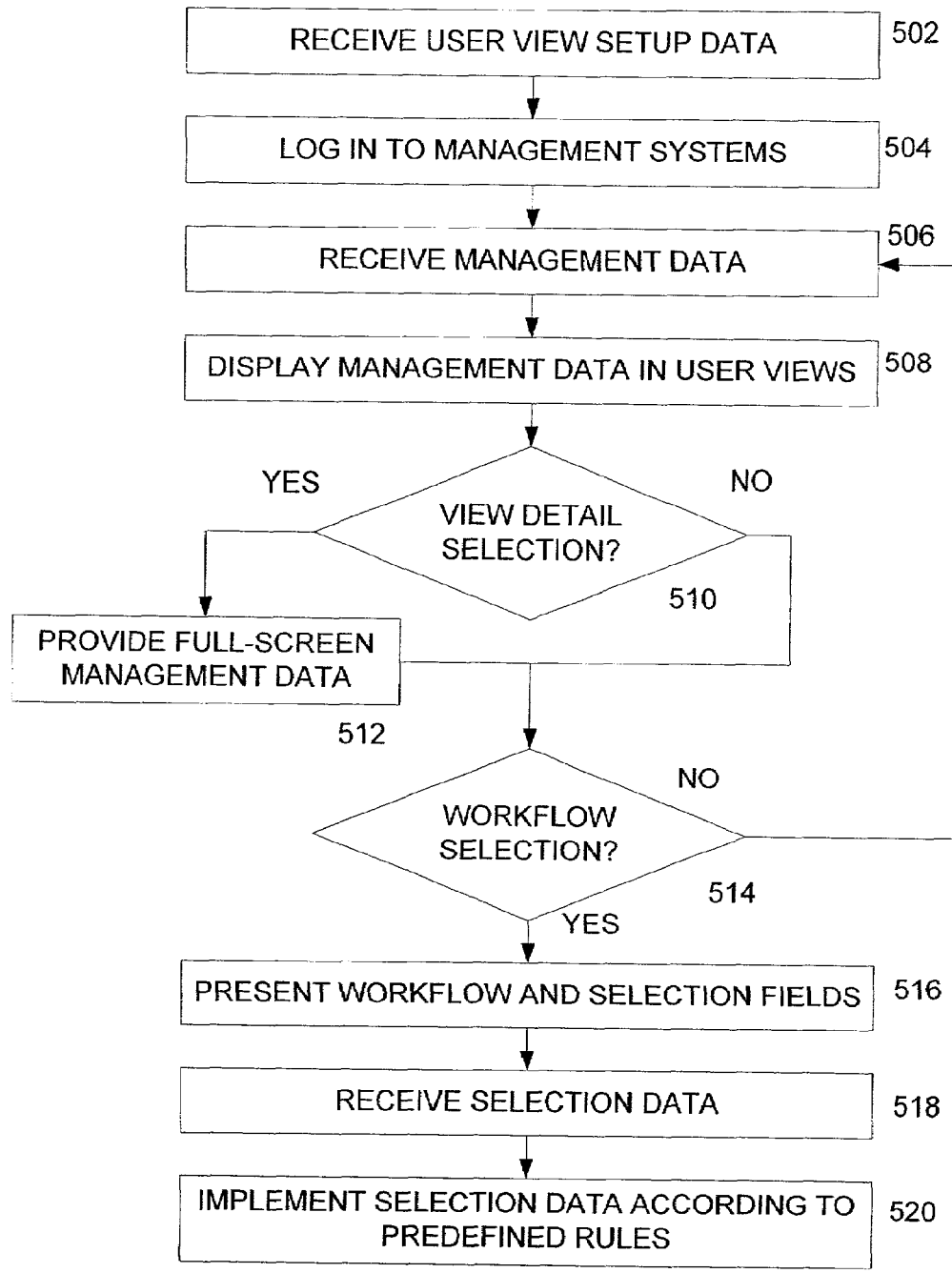
FIG. 5 is a flowchart of a method for providing portal functionality in accordance with an exemplary embodiment of the present invention.

FIG. 5 is a flowchart of a method 500 for providing portal functionality in accordance with an exemplary embodiment of the present invention. Method 500 begins at 502 where user view setup data is received. User view setup data can include user view default data entered by an operator, user view personalization data received from a user, user security restriction data, user role data, role security restriction data, or other suitable user view setup data. The method then proceeds to 504.

At 504, a user logs on to one or more management systems. The user logon can be performed individually at each management system, can be coordinated such that the user provides a single user ID and password and that user ID and password is mapped to a plurality of user IDs and passwords for the plurality of management systems, or other suitable procedures can be used. The method then proceeds to 506.

At 506, management data is received from one or more management systems. In one exemplary embodiment, the management data can include management data that has been selected based upon a user's security level, role data for the user, user selected criteria, available window size, or other suitable selection criteria. The management data can also include network data, such as software application data (showing which software applications are active, the number of users), device data (such as status data for routers, bandwidth realized over a communications medium), failed or inoperable components, and other suitable network data. The method then proceeds to 508.

At 508, the management data is displayed in a user View screen. The method then proceeds to 510 where it is determined whether a view detail selection has been made. In one exemplary embodiment, the user can select one or more of the windows being displayed in the View screen and those windows can be increased in size, information, content, or other suitable details. If it is determined at 510 that a view detail selection has been made, the method proceeds to 512 where full screen management data is provided. Likewise, a fractional screen in the View screen can be provided to the user if the full screen management data is not required. The method then proceeds to 514. Likewise, if no new detail selection is made at 510, the method proceeds directly to 514.

At 514, it is determined whether a workflow selection has been chosen. If no workflow selection has been chosen the method returns to 506. Otherwise, the method proceeds to 516. At 516, one or more workflow selection fields are presented to the user. For example, the workflow selection fields can include identification and selection data for one or more workflows, selection data for one or more fields within a workflow, or other suitable workflow selection data. The workflow selection data can also be extracted from one or more of the management windows, such that predetermined data fields in the management windows are extracted and translated if necessary to provide input to the workflow selection fields. The method then proceeds to 518.

At 518, the selection data is received from the user. The selection data can include data that is obtained by the user from one or more additional tools, such as an element information system or other suitable tools. The method then proceeds to 520 where the selection data is implemented according to one or more predefined rules. For example, the selection data can be used to provide input to one or more management systems so as to allow management systems to respond to an operating event or perform other suitable functionality. The workflow can also be implemented using data fields extracted from one or more of the management windows, such that predetermined data fields in the management windows are extracted and translated if necessary to provide input to the workflow.

In operation, method 500 allows a user to access a portal system to observe network management data and further allows the user to implement one or more workflows to respond to operating events or perform other suitable functionality. Method 500 thus allows users to respond to network conditions without having to toggle between two or more network management applications, manually transfer data between network management applications, repeatedly log in and log out of network management applications, or otherwise perform tasks that can result in the misoperation of network management systems if not properly performed.

Figure 6:
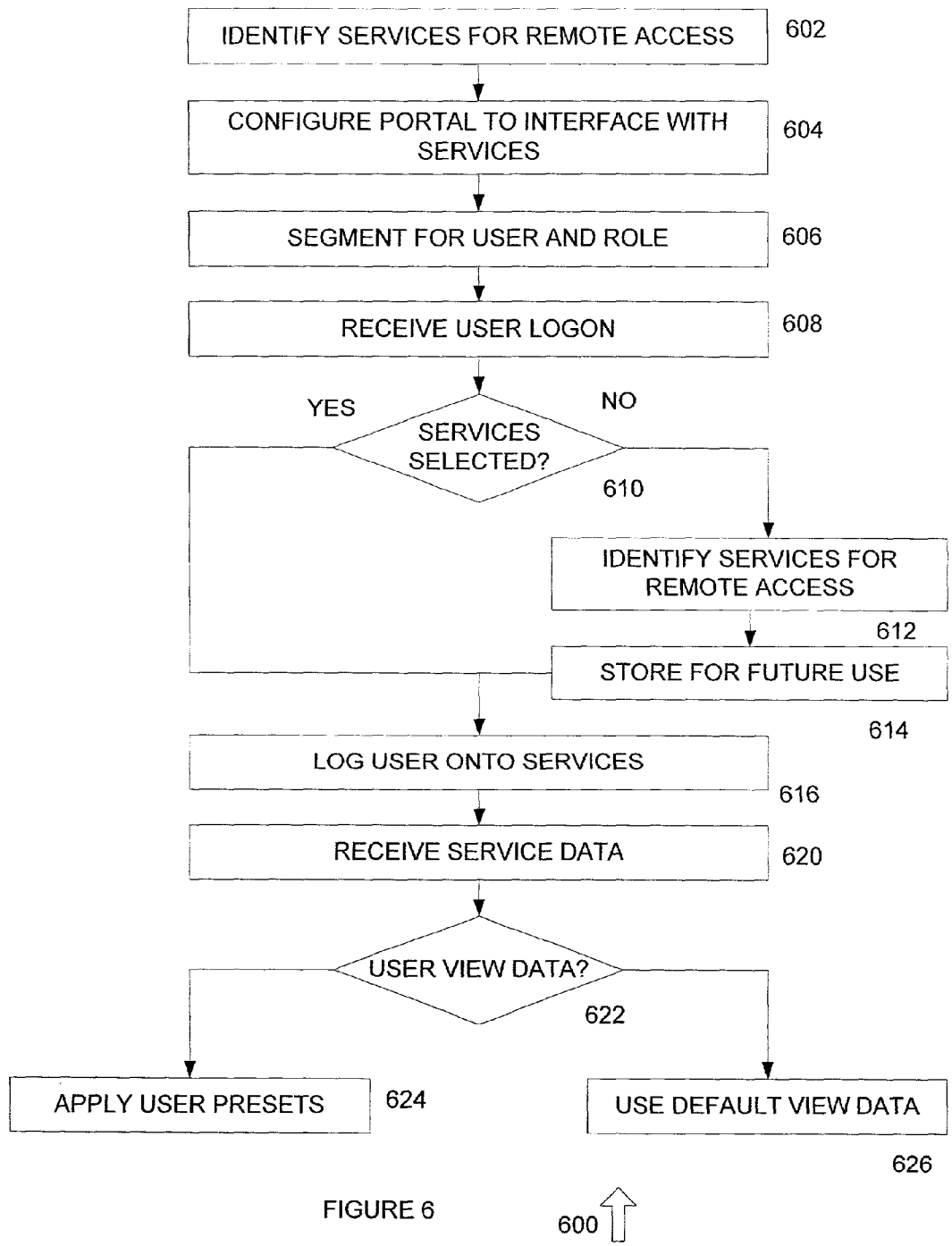
FIG. 6 is a diagram of a method for providing portal interface functionality in accordance with an exemplary embodiment of the present invention.

FIG. 6 is a diagram of a method 600 for providing portal interface functionality in accordance with an exemplary embodiment of the present invention. Method 600 begins at 602 where network management services are identified for remote access. The network management services can include one or more services for which firewall-restricted access to a network is desired, such that the remote access users are not directly interfacing with the server or management systems, where limited functionality or access to the network or management systems is provided, and where the user would otherwise be restricted from simultaneously accessing two or more of the network management services or other services. The method then proceeds to 604.

At 604, the portal View screen is configured to interface with the pre-determined services. The View screen can be implemented in documents using XML that has a predetermined schema or document type definition that allows predefined fields or services within the management systems to be accessed. Likewise, other suitable system configurations can be used. The method then proceeds to 606.

At 606, access to the services can be segmented in accordance with user and role segmentation rules. In one exemplary embodiment, network management system functionality for certain users or for certain roles can be identified in advance, such that a user logging on will be provided with full access to network management system functionality that is required by the user. In another exemplary embodiment, the network management systems can be used to provide network management services, such that the user and role functionality can be used to prevent users seeking access to network management data and services for a first network from being able to access data and services for any of the other networks that are being managed. The user can also be provided with predetermined management data and predetermined access to one or more workflows that have been identified for that user. The user can also be assigned a role, where management data and workflow access for that role have been previously identified. Other suitable segmentation can be used. The method then proceeds to 608.

At 608, user log on data is received. The method proceeds to 610 where it is determined whether services have been selected by the user. If services, such as network management services viewed through the View screen, have been selected by the user, the method proceeds to 616. Otherwise, the method proceeds to 612 where services are identified for remote access. In one exemplary embodiment, the services can include one or more services based upon user, role or other data. Likewise, the services can include selections made by the user at log on, or other suitable selections. The method then proceeds to 614 where any such user selections are stored for future use. The method then proceeds to 616.

At 616, the user is logged on to one or more network management services or other suitable services. For example, the user can enter a password and user ID, which can then be mapped to one or more corresponding passwords and user IDs for the network management services. The method then proceeds to 620.

At 620, service data is received from one or more service management systems or other suitable systems. Service data can be received in accordance with an *.XML application or other suitable applications having predefined data fields, such that the data fields can be restricted based upon user or role security access levels. The method then proceeds to 622.

At 622, it is determined whether user view data exists. For example, the user view data may include restricted fields to be presented in a View screen when multiple windows are present, user or role restriction data, or other suitable user view data. If user view data is determined to exist at 622, the method proceeds to 624 where the user presets are applied to the views. Otherwise, the method proceeds to 626 where default view data is applied to the service data.

In operation, method 600 allows remote access to be provided to one or more network services. System 600 can be used to provide proxy functionality to external users, such as in a network management system that is managing multiple networks. Likewise, system 600 can be used to allow users to view network status, perform network workflows for responding to operating events or perform other suitable functionality.

Figure 7:
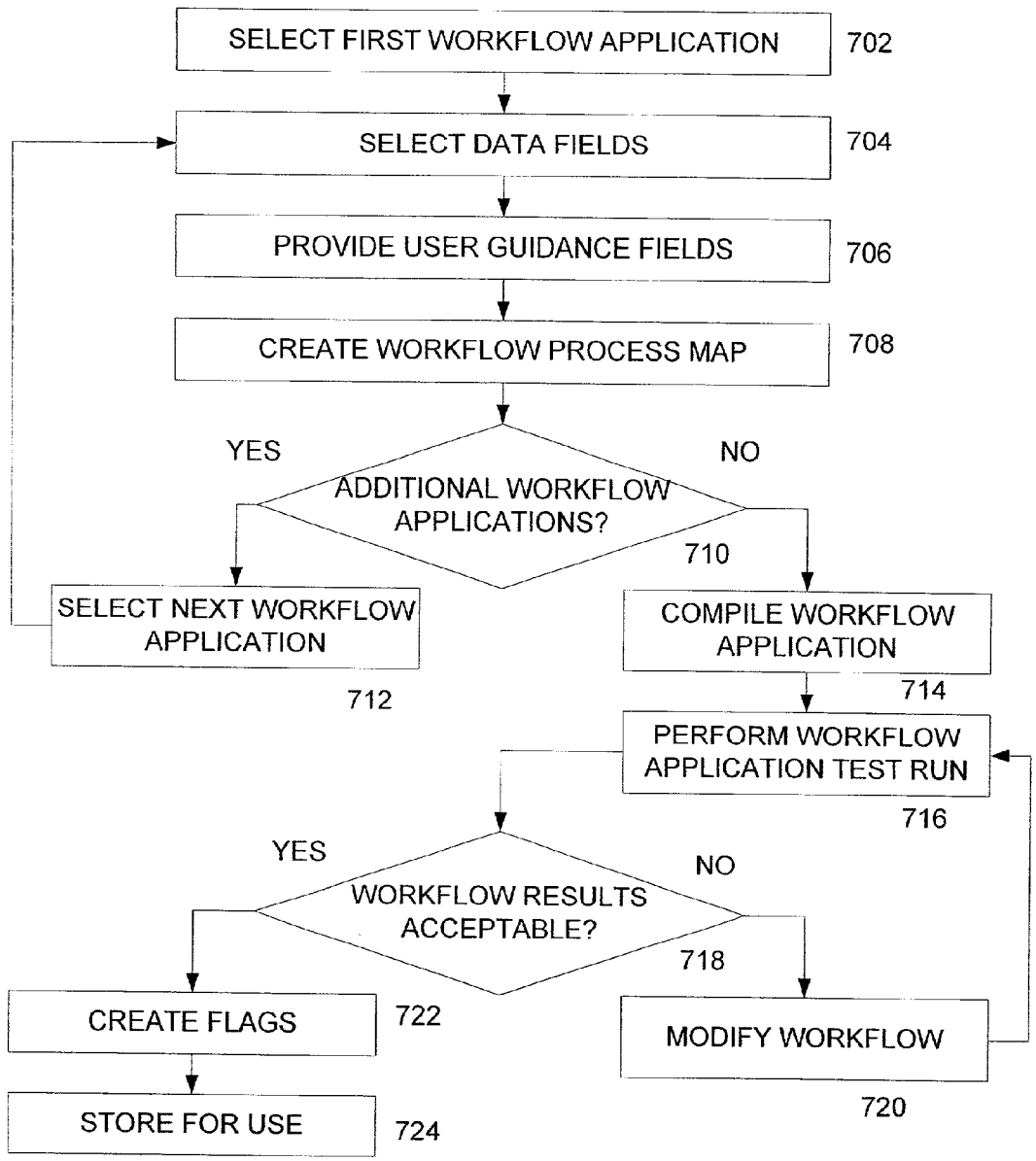
FIG. 7 is a flow chart of a method for generating a workflow in accordance with an exemplary embodiment of the present invention.

FIG. 7 is a flow chart of a method 700 for generating a workflow in accordance with an exemplary embodiment of the present invention. Method 700 allows a network operator to generate workflows for correcting problems, responding to equipment failure, correcting network conditions, and for performing other suitable actions.

Method 700 begins at 702 where a first application is selected for the workflow (the "workflow application"). The workflow application can include a device performance monitoring application, a report generation application, a standard operating procedures application, a configuration management application, a device discovery application, an event management application, a trouble ticket/help desk application, or other similar applications. The method then proceeds to 704.

At 704, one or more data fields are selected. For example, the data fields can be data fields that are used to navigate through the application to a predetermined graphic user interface, data fields for receiving user entered data, data fields associated with output fields that identify operating events or other similar data fields. The method then proceeds to 706.

At 706, user guidance fields are provided. The user guidance fields can include text messages that provide the user with guidance on what information is required for the workflow, pull-down menus or other suitable selection aids for selecting between two or more options, frequently asked questions or tutorial data, or other suitable user guidance data. The method proceeds to 708.

At 708, a workflow process map is created. The workflow process map can include the sequence commands that are needed in order to initiate the workflow application, commands that are used to transfer data fields from the network to the network management application, commands that are used to transfer data fields from the network management application to other applications, commands that are used to verify user input for user selections, or other suitable commands. The method then proceeds to 710.

At 710, it is determined whether additional workflow applications are required. For example, the workflow can be created by a series of network management applications and commands to be executed within those network management applications. The workflow can also or alternatively include commands within a single network application, or other suitable commands and data entry selections. If it is determined at 710 that additional workflow applications are needed, then the method proceeds to 712 where the next workflow application is selected. The method then returns to 704. Likewise, if it is determined that additional workflow applications are not needed, the method proceeds to 714.

At 714, the workflow application is compiled. For example, a file containing the workflow information can be stored, and the workflow can be configured for automatic execution on selection of the file. Other suitable compilation procedures can be used. The method then proceeds to 716 where a workflow application test run is performed. The workflow application test run can include one or more problem sets that are used to determine whether the workflow application has been properly configured. After completion of the workflow application test run, the method proceeds to 718.

At 718, it is determined whether the workflow results are acceptable from the test run. If it is determined that the workflow results are not acceptable, the method proceeds to 720 where the workflow is modified to correct any problems. The method then returns to 716. If it is determined at 718 that the workflow results are acceptable, the method then proceeds to 722 where one or more flags or other suitable systems or methods are created to tie the workflow into the network management View screen. The workflow can be correlated to one or more error messages with an operating command that causes a workflow selection to be generated, the workflow can be associated with one or more network management applications, or other suitable procedures can be used. The method then proceeds to 724 where the workflow is stored for use.

In operation, method 700 allows an operator to store one or more workflows for responding to network conditions, equipment failures, problems, or other situations in which an operator response is required. Method 700 can patch unrelated network management applications together to reduce the need for skilled operators to be available, can transfer data between applications such that data entry errors are reduced or eliminated, provides user guidance so that operators that lack the experience to develop a workflow independently can still implement the workflow, and provides other useful network management functions.

Figure 8:
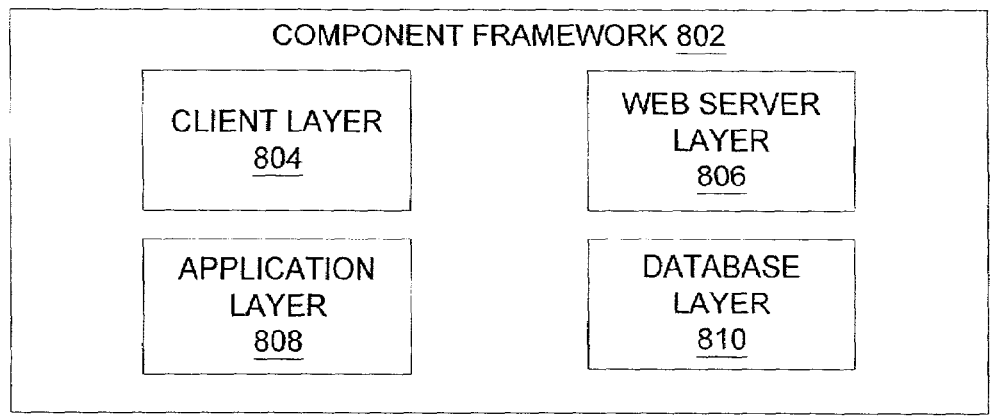
FIG. 8 is a diagram of a component framework architecture in accordance with an exemplary embodiment of the present invention.

FIG. 8 is a diagram of a component framework architecture 800 in accordance with an exemplary embodiment of the present invention. Component framework architecture 800 includes component framework 802, client layer 804, web server layer 806, application layer 808, and database layer 810, and can be implemented in software, such as an application programming interface implemented as a Java Server Page (JSP), or other suitable software functionality.

Component framework 802 identifies the View screen component model definition and the system for displaying and interacting with View screen components, which are base objects and graphical user interface (GUI) models. The View screen component is similar to an object in object-oriented programming systems, as it encapsulates both state and logic. In one exemplary embodiment, the View screen component uses JSP or a servlet to implement its logic, where execution of the logic results in the generation of *.HTML or other suitable data. JSP logic requires state data when the JSP logic is invoked, such that the state data must be provided to or retrievable from within the JSP. In this exemplary embodiment, the View screen component can be likened to an instance of a Java class, where the class data is the View screen component state, and the class method is a handleRenderRequest( ) command, which is implemented in JSP.

The component's API allows the JSP author to extract and store the component's persistent data. Supporting all of the persistent data requirements of a component through the component API requires knowledge and control of the variation of a component's data, which can be referred to as "scope." The scope of a component data item identifies a rule for managing the values of the item. The following scopes have been defined:

Service collection—applies to all services within the collection
service—applies to all service user components
component—applies to component
role space—varies by the context of role space
containment parent—special case for data that is not local, asked for from parent component Client layer 804 comprises the web browser's view, and as such provides the most visible incarnation of a component. Pages, views, channel frames, and channels are examples of components evident in this layer. The presentation of visual representation data of a component is the primary function of the client layer. A component that exists on the client side can be communicated to by reference data on the server. The reference data does not need to be directly available on the client. For example, header data and footer data associated with a web page layout might not have direct client side referenceability.

The web server layer 806 is the second layer in which the component concept is visible. In one exemplary embodiment, web server layer 806 can be assembled from a collection of JSP and servlets. In this exemplary embodiment, the component can be represented by a JSP module that translates the component into *.HTML data for visualization in the client layer 804. The component can also be represented as a JAVA component object that provides the data to the JSP module in order for it to perform translation. Web server layer 806 also provides functionality for all components to ensure that they each have a reference and can generate *.HTML data.

Web server layer 806 can also be used to control role functionality for a component, such that the component provides data specific to the role of the component user or domain of a group of users. For example, while two users may have access to a given channel, one user may have that channel in a minimized state while the other has the channel expanded. These separate settings to the same component are stored by web server layer 806 in order to provide domain user and role-specific interpretations of the component. Likewise, web server layer 806 can also control style data, where each component has one or more style data parameters. Styles can be a special version of domain user and role-based values. Components that do not specify one or more style data parameters can inherit a value for that parameter from the most immediate-containing component that provides the specification for that value.

Application layer 808 can be accessible through an object request broker, and can have a component data model object that provides user-specific versions of the component and user-specific versions of the component data model objects. These user-specific components are the Java component objects returned to the web server JSP layer, which are used for layout and presentation. In one exemplary embodiment, the object request broker can be the Voyager™ object request broker available from Objectspace, Inc. of Dallas, Tex.

Database layer 810 includes components that are stored by fields into a database table. Database layer 810 performs the mapping between the object-based data model used within the application and the relational database that stores the actual content. In one exemplary embodiment, database layer 810 can be implemented using the Toplink™ system available from Webgain, Inc. of Santa Clara, Calif.

In operation, component framework architecture 800 provides an architecture for providing an enterprise portal system. Component framework architecture 800 can be used to generate APIs for interfacing with one or more management systems, such as in a portal system 102. The component framework architecture 800 can allow a management interface system 108 and workflow system 110 of a portal system 102 to interface with a plurality of management systems 104a through 104n, and can further allow domain-, role-, and user-specific data to be provided to a client 112 based upon domain-, role-, and user-specific data associated with a client. In this manner, component framework architecture 800 provides proxy functionality and other suitable functionality that allows users to access a server system 106 and management systems 104a through 104n.

Figure 9:
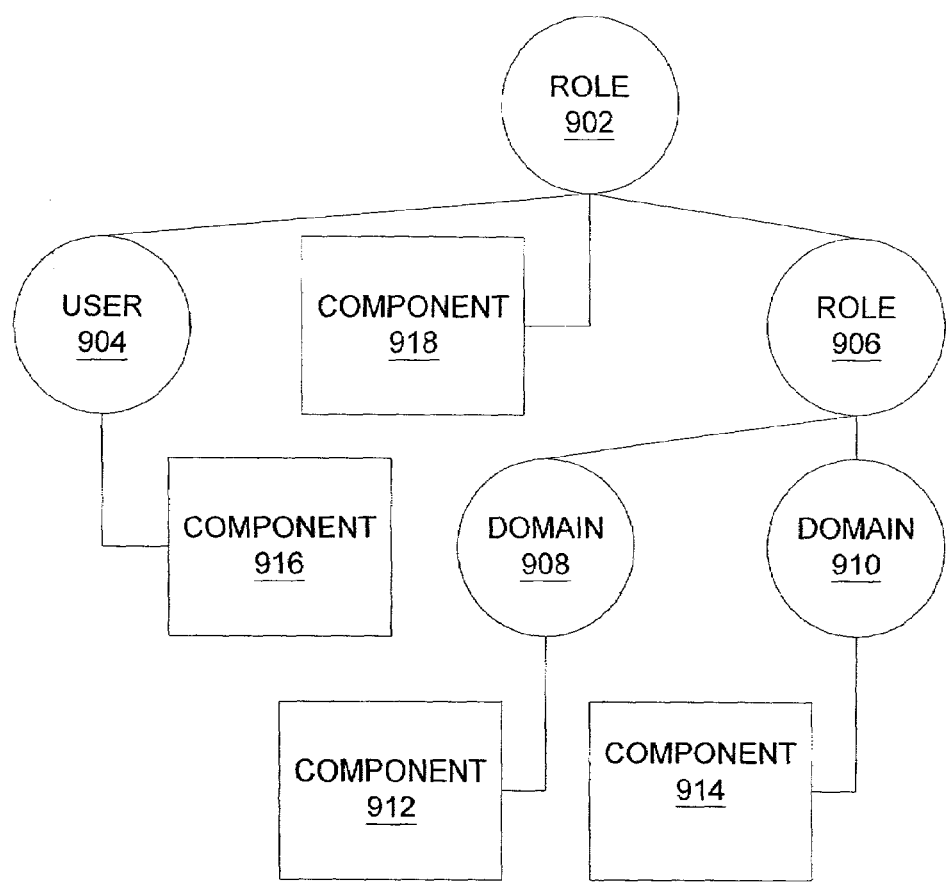
FIG. 9 is a diagram of a hierarchy for use in providing enterprise portal functionality.

FIG. 9 is a diagram of an hierarchy 900 for use in providing enterprise portal functionality. Hierarchy 900 can be used to provide role and user functionality for access to one or more management systems 104a through 104n by a user, so as to provide enterprise portal functionality.

Hierarchy 900 includes role 902. A role is an hierarchical mechanism that creates collections or groups of users, and can facilitate the management of capabilities, the storage of preferences, securing of content, and other functions. The root node of a role hierarchy defines a boundary that contains all roles in the system. The rolespace can be decomposed to a suitable depth, and any suitable structure can be imposed on the decomposition. The structure of the rolespace can be determined by a system administrator so that it can be configured to support the organization's operational needs.

Hierarchy 900 also includes user 904 and role 906. User 906 inherits directly from role 902. In this manner, both user 904 and role 906 inherit characteristics from role 902, but can include additional characteristics that are not present in role 902. Likewise, user 904 can also be assigned to one or more other roles such that the user inherits the functionality or features of those roles in addition to any functionality or features that are defined for the user.

Domains 908 and 910 are assigned to role 906. Thus, domains 908 and 910 inherit from role 902 and role 906. Each domain can also include one or more users or components. Each domain is mutually exclusive. Domain 908 is assigned component 912 and domain 910 is assigned component 914. The component can include a GUI to a management system in a Page, View, Container Channel, Service Channel, Channel Frame, or other suitable component such as in accordance with a component framework architecture 800. Likewise, a component can be directly associated with a user, such as component 916 and user 904, and a role, such as component 918 of role 902. These component types are further described below.

A Page component type can be used to determine the overall structure of the returned content. The JSP associated with the page can provide the guidance for the overall layout of the returned information. A system will typically have a different page component for different look and feel schemes that are supported. A View component type is a container that provides the top level organization of the content that is being presented to the user. Each View can be used to organize a collection of information that has a relationship with a task or entity. For example, in a managed services environment, a help desk user can have a View created for each of their customers.

A Channel Frame component is not typically directly exposed to the end user, and instead is part of the look-and-feel aspect of how the different types of channels (such as Container Channels and Service Channels) are rendered. A Container Channel is a mid-level component that can be contained within a view, and can be used for organizing collections of one or more channels. A Service Channel is a component that includes a parameterization of a particular network management service available to the portal system.

Security in the content tree can be accomplished through the use of two constructs, denials and grants. Each node in the tree can contain denial roles or grant roles, such as denial or grant of the ability to read, write, delete, or change permissions, or perform other suitable functions. Security also flows through to subordinate roles and users, such that if a role has been given a security setting, any sub-role, user, or domain that inherits from that role will also be given those security settings if no other security settings are provided. Furthermore, while a more expansive grant can be provided to such sub-roles, users, or domains, denials will flow through and limit the ability to grant access.

In operation, architecture 900 allows access to components in an enterprise portal system to be organized according to user, role, domain, or other organizational structures. Architecture 900 can be used to implement an enterprise network portal having workflow functionality, such that controlled access to a server system 106 and one or more management systems 104*a* through 104*n* can be provided to one or more users.

Figure 10:
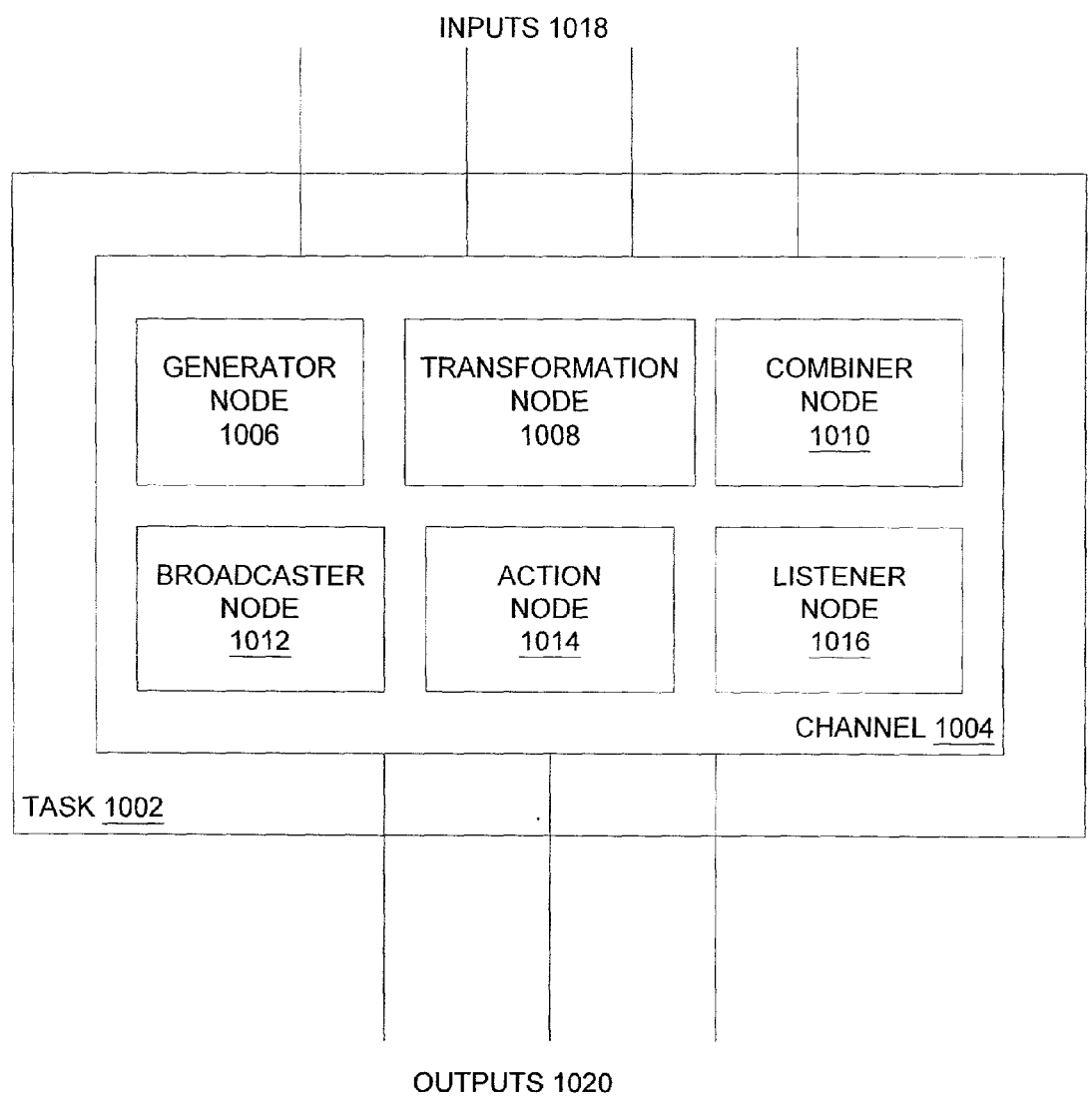
FIG. 10 is a diagram of a process flow in accordance with an exemplary embodiment of the present invention.

FIG. 10 is a diagram of a process flow 1000 in accordance with an exemplary embodiment of the present invention. Process flow 1000 includes an exemplary task 1002, channel 1004, and nodes that can be used to implement a workflow process in accordance with an exemplary embodiment of the present invention, each of which can be implemented in hardware, software, or a suitable combination of hardware and software.

Workflow 1000 includes task 1002. Task 1002 encapsulates a channel and has a set of inputs and a set of outputs. The inputs can be routed to the inputs of the channel, which can be contained within task 1002. Additionally, task 1002 can bind inputs for its channel that are not exposed to the external definition of task 1002. To support the user's interaction with the system, a user query can be associated with each of the inputs to task 1002. In one exemplary embodiment, these input queries can be presented by a GUI to request values from the user.

Although a channel does not need to provide any outputs, Task 1002 can specify such outputs where suitable. These outputs can be specified by user interpretation. For example, if the channel returns the result of a trace route, one of these outputs might be the IP address of the last node reached by the trace route. The workflow process can request the user to interpret the channel's execution results and enter that information, thus binding that particular output value. The outputs to task 1002 do not necessarily need to be used. Similar to the inputs to task 1002, each output can have an associated query that can be presented to the user in order to direct the user to collect the appropriate information. Task 1002 can also have frames (such as task channel frames or task frames) that are used to render task 1002 for presentation purposes.

One or more Procedures can be used to bind one or more tasks 1002 together into a workflow. Procedures specify three key pieces of information: a set of tasks 1002, the linking between the tasks 1002, and a set of declarations. The declarations create a variable space that is used by the Procedure to create relationships between the output values of one task to the input values of another task. The links in the Procedure determine the flow of operations within the Procedure.

Channel 1004 can be a channel, a container channel, a service channel, or other suitable channels.

Generator node 1006 is a producer of streams of information. In one exemplary embodiment, generator node 1006 can be a hypertext transfer protocol (HTTP) generator which has control settings that allow it to retrieve HTTP-accessible information. In another exemplary information, generator node 1006 can be a file generator where the controls to the node allow the node to be pointed at a file and pull that information from the disk drive and feed it out its connected output stream. Generator node 1006 can further be an object that produces streams of information for consumption by other nodes in the network.

Transformation node 1008 takes a single stream as input and produces a single stream as output. This node is useful for mapping data formats from one representation to another. In one exemplary embodiment, transformation node 1008 is an *.XSL transformation node which takes as input an *.XML information stream, has a control parameter which points to an *.XSL transformation file which produces a new *.XML data stream that results from the application of the XSLT to the incoming *.XML data stream.

In another exemplary embodiment, transformation node 1008 is a TIDY HTML parser transformation node, available from the World Wide Web Consortium, which takes as input an HTML information stream and outputs a well-formed XML data stream as its output.

Combiner node 1010 is applied to two or more streams and contains the logic necessary to coordinate those streams. In one exemplary embodiment, combiner node 1010 takes multiple ASCII streams and applies combination logic to produce a single ASCII stream. In another exemplary embodiment, combiner node 1010 can include an appended combiner which takes two streams and appends the second stream to the first stream. Appended combiner streams can be cascaded to accommodate situations where more than two streams need to be appended to each other. Combiner node 1010 takes multiple inputs and combines them in order to form the output result of the incoming streams.

Broadcaster node 1012 takes a single ASCII stream and can distribute that stream to one or more of its connected output streams. In one exemplary embodiment, broadcaster node 1012 includes a selection node having controls that determine which output stream the incoming stream will be delivered to. In another exemplary embodiment, broadcaster 119 node 1012 includes a multitask node that sends a copy of its input stream down each one of its connected output streams. Broadcaster node 1012 takes a single input stream and sends the stream out one or more of its connected output streams.

Action node 1014 takes one or more input streams and has a set of controls for manipulating its behavior but produces no output streams. Rather, the action node has the ability to dynamically set the control values on other nodes in the network. In one exemplary embodiment, action node 1014 includes a dynamic generator control setting that takes a single input stream and extracts information from that stream (such as a target URL) and uses that information to parameterize a generator node that appears further on in the network.

Listener node 1016 acts as a construct that is attached to a link of a network that provides visibility into the stream that is passing between two nodes of a network. The listener node 1016 connects at the streams that run between the nodes and then implements logic that can interpret the results of these streams.

Inputs 1018 and outputs 1020 can include dynamically fed inputs into task 1002, user-queried inputs and outputs, such as those that are provided in response to a user query, fixed values for predetermined tasks, or other suitable values. Inputs 1018 and outputs 1020 can be connected to other tasks 1002 to form a process.

In operation, nodes are combined to form networks that facilitate the extraction and transformation of information. The services performed by the connection of nodes can then be combined as individual tasks into a Procedure. Portions of a Procedure can be reused across multiple procedures or within the same procedure.

Figure 11:
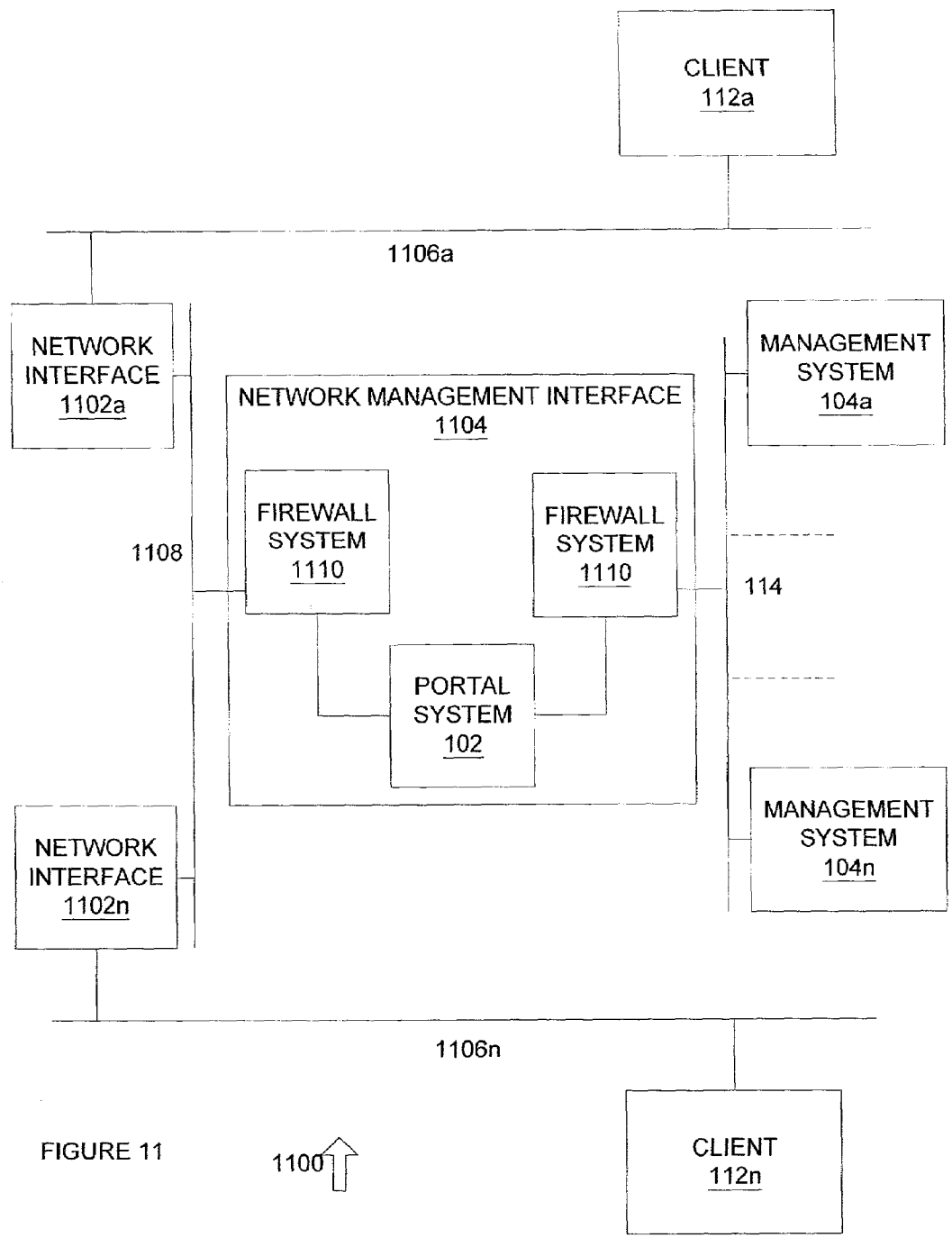
FIG. 11 is a diagram of a system for providing portal access in an MSP environment in accordance with an exemplary embodiment of the present invention.

FIG. 11 is a diagram of a system 1100 for providing portal access in an MSP environment in accordance with an exemplary embodiment of the present invention. System 1100 allows users for any of the networks being managed by the MSP to access data and services from management systems 104a through 104n for their networks, while preventing the users from accessing data and services for other networks.

System 1100 includes network interfaces 1102a through 1102n, which can be implemented in hardware, software, or a suitable combination of hardware and software, and which can be one or more software systems operating on a general purpose server platform. Communications medium 1108 can be one or more T1 lines, frame relays, or other suitable communications medium or combination of communications media, and can include a dedicated T1 line or frame relay to each network 1106a through 1106n, respectively.

Network management interface 1104 includes firewall systems 1110 and portal system 102, which are used to provide access to network management systems 104a through 104n for clients 112a through 112n. Clients 112a through 112n can either access portal system 102 over networks 1106a and 1106n, respectively, and communications medium 1108, or through other suitable communications media, such as the PSTN or the Internet. Portal system 102 provides limited access to each client 112a through 112n based upon user, role, and domain assignments. In this manner, each client 112a through 112n can access data and services for their corresponding network 1106a through 1106n, and can be blocked from accessing data and services from any other network. Likewise, clients 112a through 112n can be provided with concurrent access to two or more management systems 104a through 104n, without requiring multiple access points through the firewall systems 1110 of network management interface 1104.

Although exemplary embodiments of a system and method for providing an enterprise portal have been described in detail herein, those skilled in the art will also recognize that various substitutions and modifications can be made to the systems and methods without departing from the scope and spirit of the appended claims.

What is claimed is:

1. An enterprise network management portal system for monitoring and managing at least one enterprise network, wherein each enterprise network includes at least one server system and a plurality of network management means for monitoring the status of each server system and generating management data concerning monitored operating events of the monitored server system that are in need of correction, and wherein the management data include device status data, event data, and device performance monitoring data, the system comprising:

portal means for providing an interface to the plurality of network management means for:
(a) receiving the management data from the plurality of computer network management means of an enterprise network and providing the management data for the plurality of network management means to a client for display to a user and
(b) generating workflows that provide corrective measures for monitored operating events that are in need of correction, wherein the client is coupled to the at least one computer network management means, wherein the portal means includes:
(a) management interface means for providing application and data interface functionality between the at least one computer network management means and the client; and
(b) workflow means for receiving the management data from the plurality of computer network management means and providing in response to the management data one or more workflows for responding to monitored operating events that are in need of correction, and wherein the workflow means includes:
(1) interface format means for transferring data fields between the client and the plurality of computer network management means in accordance with predetermined data field definitions;
(2) workflow edit means for enabling an operator to set up a workflow for performing functions including device troubleshooting and event management and for generating workflow sequence data;
(3) workflow execution means for receiving the workflow sequence data from the workflow edit means, for executing a workflow sequence in response to an execution command received from a user, for interfacing with the plurality of computer network management means in accordance with the workflow received from the workflow edit means, and for transferring data fields in accordance with previously-defined rules; and
(4) element information means for providing network element data for one of use in workflows and in response to workflows executed through the workflow execution means.

2. The system of claim 1, wherein the at least one enterprise network includes a firewall, wherein the at least one server system, the plurality of computer network management means, and the client are behind the firewall, and wherein the portal means also performs the function of acting as a proxy behind the firewall between the client, the at lest one computer network management means, and at least one server system.

3. The system of claim 1, wherein the portal means provides the management data in a single user-viewable display screen, regardless of whether the plurality of computer network management means are compatible with each other.

4. The system of claim 3, wherein the management interface means includes:
(1) means for receiving the management data and assembling the management data from each of the computer network management means into at least one data display channel for presentation of the management data to a user on a real-time basis in the single user-viewable display screen;
(2) means including a map of user ID and logon password data for each computer network management means that a user is authorized to access for providing the user with single logon functionality, whereby the user does not have to logon separately to each computer network management means; and
(3) means for segmenting access to network management services in accordance with predetermined user and role segmentation rules.

5. The system of claim 1, wherein the management interface means performs the additional functions of storing:
(1) preset management system window configuration data for the user-viewable display screens for the client,
(2) client modified window configuration data,
(3) user logon data that may be required for a user to access the at least one computer network management means, and
(4) channel format data for facilitating an interface with the at least one computer network management means through one of a firewall and within an intranet.

6. The system of claim 3, wherein the management interface means includes:
(1) client view means for enabling users to select channels for viewing and to customize the layout in the single user-viewable display screen, for receiving view data, for receiving the management data and assembling the management data from each of the computer network management means into at least one channel for presentation of the management data to a user on a real-time basis in the single user-viewable display screen, and for managing the management data to prevent any one of the at least one computer network management means from taking over the client;
(2) channel format means for interfacing with the computer network management means to request management data, for receiving the requested management data for presentation to users through the client view means, and for performing functionality through the computer network management means; and
(3) user login means for providing users with single logon functionality for access to the computer network management means.

7. The system of claim 6, wherein the view data includes at least one of preset client view formats, role or user-restricted view formats, user modified view formats, and other formats that include channel identification data, window size data, data field display data.

8. The system of claim 1, wherein the workflow means performs the additional function of enabling at least two unrelated computer network management means to be tied together through a common platform.

9. The system of claim 1, wherein the interface format means also performs the function of performing format conversions required for transfer of the data fields.

10. The system of claim 1, wherein the workflow execution means carries out the function of transferring data fields using the interface format means.

11. The system of claim 1, wherein the workflow execution means also performs the function of prompting the user to make a selection, enter data, and terminate a workflow.

12. The system of claim 1, wherein the system monitors and manages a plurality of enterprise networks, and wherein the portal means provides all the management data to a client external to the at least one enterprise network.

13. The system of claim 1, wherein the system monitors and manages a single enterprise networks, and wherein the portal means provides all the management data to at least one client that forms a part of the enterprise network.

14. A combination enterprise network and enterprise network management portal system comprising the system of claim 1, and further comprising at least one enterprise network, wherein the at least one enterprise network includes:
at least one server system and
a plurality of computer network management means for monitoring the status of the at least one server system and generating management data concerning monitored operating events of the at least one server system that are in need of correction.

15. The enterprise network and portal system of claim 14, wherein the portal means includes:
(a) management interface means for providing application and data interface functionality between the at least one computer network management means and the client; and
(b) workflow means for receiving the management data from the plurality of computer network management means and providing in response to the management data one or more workflows for responding to monitored operating events that are in need of correction.

16. The enterprise network and portal system of claim 14, comprising a plurality of enterprise networks, wherein the system of claim 1 monitors and manages the plurality of enterprise networks, and wherein the portal means provides all the management data to one client external to the plurality of enterprise networks.

17. A method for monitoring and managing at least one enterprise network, wherein the enterprise network includes a server system and a plurality of computer network management means for monitoring the status of the at least one server system and generating management data concerning monitored operating events of the at least one server system that are in need of correction, the method comprising the steps of:

providing application and data interface functionality between the plurality of computer network management means and a client, wherein the client is coupled to the plurality of computer network management means;

monitoring the server system using the computer network management means;

setting up through an operator a workflow for performing functions including device troubleshooting and event management and for generating workflow sequence data;

transferring data fields between the client and the plurality of computer network management means in accordance with predetermined data field definitions;

using the plurality of computer network management means to generate management data concerning monitored operating events of the server that are in need of correction, wherein the management data include device status data, event data, and device performance monitoring data;

providing the management data to the client for display to a user;

detecting at least one operating event in need of correction;

presenting to the user via the client at least one workflow in response to the at least one detected operating event;

in response to user selection of at least one workflow, receiving the workflow sequence data and executing a workflow sequence;

interfacing with the plurality of computer network management means in accordance with the workflow received;

transferring data fields in accordance with previously-defined rules; and providing network element data for one of (1) use in workflows to correct the monitored operating events that are in need of correction and (2) in response to executed workflows, thereby managing the enterprise network.

18. The method of claim 17, wherein the management data is provided to a client in a predetermined format in a single user-viewable display screen on a real-time basis, regardless of whether the plurality of computer network management means are compatible with each other.

19. The method of claim 18, wherein the at least one workflow is presented to the user in the single user-viewable display screen.

20. A method for providing portal interface functionality for at least one enterprise network, wherein the enterprise network includes at least one server system and at least one computer network management means for monitoring the status of the at least one server system and generating management data concerning monitored operating events of the at least one server system that are in need of correction, wherein the management data include device status data, event data, and device performance monitoring data, the method comprising:

providing application and data interface functionality between the at least one computer network management means and a client, wherein the client is coupled to the at least one computer network management means;

identifying network management services for remote access;

setting up through an operator a workflow for performing functions including device troubleshooting and event management and for generating workflow sequence data;

configuring a user-viewable display screen to interface with the identified network management services;

logging a user on to the identified network service with functionality in accordance with predetermined user and role segmentation rules;

receiving management data from at least one of the computer network management means;

transferring data fields between the client and the at least one computer network management means in accordance with predetermined data field definitions;

providing the management data to the client for display to the user in accordance with predetermined user and role segmentation rules in a predetermined format and in a single user-viewable display screen, regardless of whether the plurality of computer network management means are compatible with each other;

receiving the workflow sequence data and executing a workflow sequence in response to an execution command received from a user, interfacing with the at least one computer network management means in accordance with the workflow received, transferring data fields in accordance with previously-defined rules; and providing network element data for one of use in workflows and in response to executed workflows.

* * * * *